United States Patent Office 3,764,268
Patented Oct. 9, 1973

3,764,268
CONSTITUENTS-MEASURING CHEMICAL ANA-
LYZER HAVING SAMPLE-PROCESSING CON-
DUIT FEEDING ALIQUOT-PROCESSING CON-
VEYOR SYSTEM
David I. Kosowsky, Newton Centre, Andres Ferrari,
Dover, and Carl R. Hurtig, Scituate, Mass., assignors
to Damon Corporation, Needham Heights, Mass.
Continuation-in-part of abandoned application Ser. No.
105,805, Jan. 12, 1971. This application Oct. 22, 1971,
Ser. No. 191,884
Int. Cl. G01n 1/14, 1/18
U.S. Cl. 23—253 R                                10 Claims

ABSTRACT OF THE DISCLOSURE

An automatic analyzer of the amounts of different constitutes in fluids takes in a metered volume of fluid sample, and divides the sample into plural aliquots. Each aliquot is delivered to a conveyor-carried container where it is chemically processed to manifest a detectable measure of a constituent in the original sample. The processing is performed in serial succession with the processing of aliquots of other samples, and in parallel with the processing of other aliquots of the same sample for measuring other constituents.

BACKGROUND

This application is a continuation-in-part of the commonly-assigned and now abandoned U.S. patent application Ser. No. 105,805 filed Jan. 12, 1971, for "Constituents-Measuring Chemical Analyzer Having Multiple Concurrently-Operated Aliquot-Processing Conveyors."

This invention relates to automatic equipment for measuring constituents in liquids.

The invention is useful for analyzing a variety of liquids, including blood serum and other biological fluids. The equipment operates on a cyclical basis and in each cycle takes in a new sample and delivers aliquots of it to separate conveyor-carried containers. In the containers, the sample aliquots are reacted with different chemical reagents to produce different constituent-measuring reaction products, which are then measured to identify the amounts of the several constituents in the original sample.

Automatic constituent analyzers of liquids are known, as described for example in U.S. Pats. Nos. 2,797,149; 2,879,141; and 3,241,432; and as also described in U.S. Pats. Nos. 3,192,968; 3,193,358; and 3,193,359. Analyzers of the type disclosed in the former patents have tubing forming essentially continuous flow-stream paths from the entry of a sample into the analyzer, through the admixture and incubation of aliquots of the sample with one or more reagents, to the final steps of measuring the constituent-identifying reaction products. Aliquots of a number of different samples are in each such flowing stream, in serial succession.

The latter group of patents, on the other hand, discloses analyzers of the type in which at successive times different aliquots of each sample are transferred from a main sample-carrier to different selected secondary carriers, each of which chemically processes an aliquot to produce a measure of a different constituent. Each aliquot is generally transferred from one container to another several times, as it is carried and processed and measured on different devices. Moreover, the analyzers of the latter group of patents initiate processing of a sample with the sample in a test tube or other discrete container. Diluent is added to the individually-contained sample and the two liquids are mixed while in the container. Where one or more constituents of the sample are to be removed prior to analyzing the remaining liquid, these constituents are precipitated in the container, and the supernatant liquid is transferred to another discrete container, from which aliquots are withdrawn into further separate containers for processing in accordance with the several constituent-identifying analyses to be performed.

Each of these types of prior chemical analysis instruments, the former flowing-stream type and the latter sequentially-operating type, is considered to have disadvantages. For example, the former instruments require further apparatus to segment each stream of sample aliquots with air to avoid the excessive inter-sample contamination that otherwise occurs. The latter instruments, on the other hand, require an excess of liquid-transferring mechanisms, and the sequential processing of aliquots of the same sample presents problems in correlating the different constituent measures for each sample. Also, the use of discrete containers for the sample liquid, aliquots and reaction-products throughout the processing in the latter instruments is considered to require excessive apparatus and hence to be costly.

Accordingly, it is an object of this invention to provide an improved automatic chemical analyzer of the constituents in fluid materials.

A more specific object is to provide an automatic chemical analyzer for measuring constituents of liquid materials which has both comparatively hig inter-sample isolation and a relatively simple mechanical mechanism.

Another object the invention is to provide an analyzer of the above character which is flexible in that the reaction sequence, time, and temperature for each different constituent analysis can be adjusted relatively readily.

Another object of the invention is to provide an automatic chemical analyzer of the constituents in fluids which operates with high and reliable correlation of the measurements made on different aliquots of the sample. For attaining this objective, it is a further object to provide such an analyzer that processes multiple aliquots of each sample in a step-by-step parallel sequence.

It is also an object of the invention to provide a materials analyzer of the above character that operates with relatively simple control logic.

A further object of the invention is to provide an analyzer of the above character which is relatively economical in terms of the consumption of reagents, diluents, and wash liquids, in that the volume of each such liquid which is consumed is metered or can otherwise be controlled readily.

It is also an object of the invention to provide an automatic chemical analyzer of the constituents in liquids which can chemically process two or more aliquots of a sample in an improved identical manner except as specifically provided, thereby to measure accurately constituents on a differential basis. A further object is to provide such an analyzer which can process aliquots of a single sample for differential analysis, such as by rate reactions or comparative reactions, which can concurrently and in step therewith process aliquots with reactions that proceed a known degree to completion.

Other objects of the invention will in part be obvious and will in part appear hereinafter.

GENERAL DESCRIPTION

An analysis instrument embodying this invention typically has a conduit into which a sampling device introduces a liquid sample. Diluent generally is also introduced into the conduit for mixing with the sample liquid while in the conduit. The conduit divides into a number of branch conduits equal at least to the number of constituents that are to be measured, and an aliquot of the generally diluted sample is delivered to each branch conduit.

In one particular embodiment of the invention, the discharge end of each branch conduit feeds into a reaction magazine, where the sample aliquot enters a cup or like vessel. Each reaction magazine, which typically is used in a single constituent measurement, has a number of such cups, and incrementally conveys them successively through a number of positions on a repeated, cyclic, basis. A reaction magazine cup receives a sample aliquot in a first of these positions, and, in the same and/or other positions, receives one or more reagents according to the constituent-manifesting chemical reaction being carried out in the cups of that reagent magazine.

In another embodiment of the invention, the branch conduits discharge the sample aliquots into different reaction containers carried on a single conveyor or carried on a number of different conveyors, the number of which however is fewer than the number of constituent analyses to be performed. The one or more conveyors, as the case may be, then carry the sample aliquots in separate containers throughout the addition of reagents and the incubation during which the reaction product of interest is being produced.

Photometers, or other measuring devices, measure the reaction products produced in the several reaction magazines or other conveyor system and, operating with readout equipment, produce the desired readings of the constituents in the initial sample. For this purpose, the reaction product and other liquid in each container generally is transferred to a separate output conduit for delivery to the measuring device, and thence for discharge from the instrument.

Thus, an instrument embodying the invention receives sample liquid in a conduit, and subjects it to initial processing including dilution and splitting into aliquots as the liquid flows along the conduit. The instrument delivers the several sample aliquots to separate containers, where each is subjected to the processing that produces a reaction-product. This reaction-product is then measured, generally after transfer of the liquids into further conduits that contain the liquids throughout the measurement.

Typically, in each operating cycle, according to the first embodiment noted above an instrument (1) receives a sample and delivers aliquots of it to different reaction magazines; (2) cleanses the sampler mechanism, input conduit and branch conduits; (3) delivers reagents to cups of the reaction magazines; (4) provides time for each aliquot-reagent reaction to proceed; (5) measures the reaction products from aliquots introduced in an earlier cycle and produces the desired printout or other record of this data; and (6) cleanses the reaction magazine cups in which all of the foregoing operations have been completed, prior to incrementing the cups to the positions where they receive a fresh sample aliquot. Also in each cycle, the instrument cleanses the photometers or other measuring devices. Each sample preferably is of metered volume and is diluted with a metered volume of a selected liquid prior to being divided into aliquots, or at least prior to delivery of the aliquots to the reaction magazine device.

With this sequence, there is only a single sample present in the input and branch conduits at any time. Also, aside from the wash liquid that cleans the input and branch conduits, they generally otherwise contain air or other gas. Further, in a preferred embodiment, all aliquots of a given sample progress through the instrument simultaneously and the resultant constituent-measuring information obtained from them is produced and manifested on the output device in a single operating cycle.

The reaction magazines or other conveyor equipment and the sequencing control components of the instrument further are constructed in such a manner that the instrument can measure the rates of chemical reactions involving the sample aliquots and thereby obtain further information regarding the constituents of each sample. These rate reaction measurements are obtained within the same operating sequence described above and while the instrument simultaneously processes other sample aliquots in the manner outlined above.

The invention thus provides an automatic chemical analyzer of constituents of fluid materials which takes in a sample, preferably of metered volume, and divides it into aliquots which are then delivered, essentially simultaneously, to different conveyor-carried containers. As the containers advance on their conveyance means, the aliquots are reacted with reagents for selected times, and generally at least some also at selected elevated temperatures, and the different aliquots of each sample preferably proceed along this sequence in step with each other. Photometric devices measure the various reaction products resulting from each sample in a single time interval unique to that sample. The analyzer thus processes sample aliquots in chemical reaction paths along which the different aliquots of a given sample move at least in significant measure in step with each other, and typically with discontinuous advance as the conveyor means advance incrementally.

The invention accordingly comprises the features of construction, combinations of elements, and arrangement of parts exemplified in the constructions hereinafter set forth, and further comprises the several steps and the relation of one or more such steps with respect to each of the others according to which the elements and parts operate, all as exemplified in the following detailed disclosure, and the scope of the invention is indicated in the claims.

BRIEF DESCRIPTION OF DRAWINGS

For a fuller understanding of the nature and objects of the invention, reference should be had to the following detailed description, taken in connection with the accompanying drawings, in which.

DESCRIPTION OF ILLUSTRATED EMBODIMENT

Figure 1:
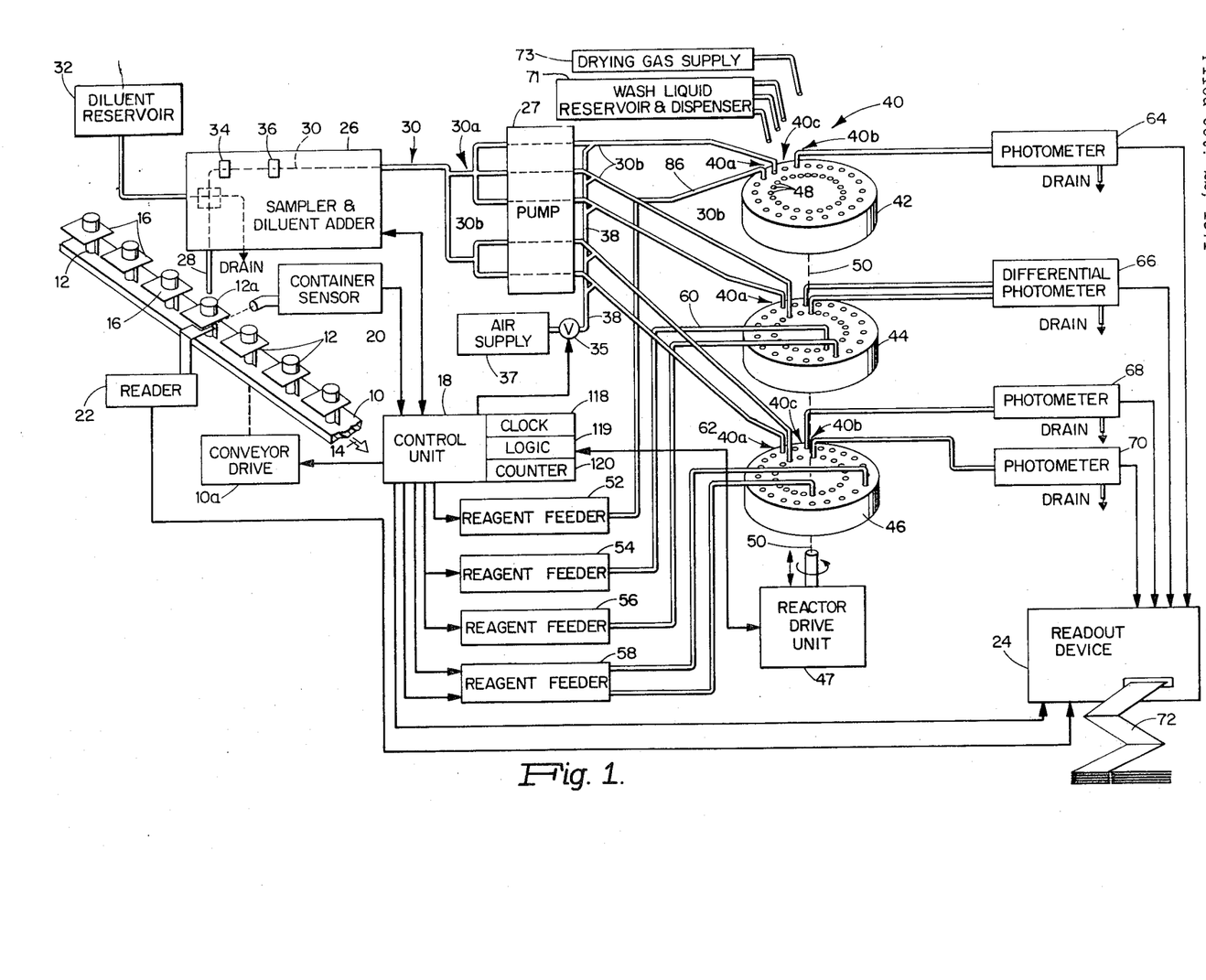
FIG. 1 is a pictorial representation, partly in block form and partly schematic, of an automatic chemical analysis instrument embodying the invention.

With reference to FIG. 1, an analyzer embodying the invention has a sample conveyor 10 carrying sample containers 12 and operating with a conveyor drive mechanism 10a to advance the sample containers forward incrementally, in the direction of arrow 14. Each sample container is illustrated as carrying a record card 16 bearing machine-readable indicia identifying, for example, the sample and/or tests to be performed on the sample.

A control unit 18 operates the conveyor drive mechanism 10a to advance the conveyor until a container sensor 20 signals the control unit that a sample container, such as the container 12a, is in a sampling position. The container sensor 20 is constructed in a conventional manner employing, for example, a mechanical switch that senses the presence of a container in the sampling position, or alternatively with a magnetic sensor, an electric eye sensor, or another known construction.

A reader 22 is provided at the sampling position of the conveyor to read the indicia on the record card 16 on the container 12a. The reader sends electrical signals identifying the indicia on the card to a read-out device 24, shown at the lower right corner of FIG. 1. The illustrated read-out device stores this information for a selected number of analyzer operating cycles and then prints it out with the measurement data which it develops from the corresponding sample.

A sampler 26, operating in conjunction with a proportioning pump 27, draws a metered volume of liquid from the container 12a at the sampling position into an input conduit 30 by way of a probe 28, which is herein considered to be part of the conduit. The illustrated sampler, which is preferably constructed as described in the commonly assigned and copending application entitled "Liquids Sampler With Probe-Bathing Chamber" Ser. No. 105,803, filed Jan. 12, 1971 in the names of J. Bannister, M. Jordan and J. Peters, selectively moves the probe 28 vertically between three positions. In a lower position, the probe extends into container 12a for aspirating the sample liquid. In an upper position of the probe, the sampler introduces, from a diluent reservoir 32, a sample-diluting and conduit-cleansing diluent liquid into the conduit 30. In an intermediate position of the probe, which is the one illustrated in FIG. 1, the sampler aspirates air into the conduit 30 via the probe.

The sampler 26 moves the probe 28 between these positions in conjunction with the control unit 18. For this purpose the sampler has two liquid sensors arranged along conduit 30. Both sensors can, by way of example, employ conductivity cells. One sensor 34 is located along the conduit to sense the leading edge of the aspirated sample when a specified volume of the sample has been drawn from the container 12a into the conduit 30. The resultant signal from this first sensor 34 actuates the control unit to move the probe from the lower position to the upper position, where the sampler aspirates diluent into the conduit. A second sampler sensor 36, located along the conduit downstream from sensor 34, detects the arrival of the leading edge of the sample in the conduit when a selected volume of diluent has been aspirated. The signal from this sensor causes the control unit to move the probe to the intermediate position, where the sampler introduces air into the conduit.

The sampler lowers the sample probe from this intermediate position to the sample-aspirating position in response to a control unit signal produced when the container sensor 20 signals that a container 12 has arrived at the sampling position.

Alternatively, other constructions which are known in the art can be used for the sampler 26 to provide similar sample aspirating, probe and conduit cleansing, and diluent aspirating operations; with proportioning pump 27 or a different type of pump.

With further reference to FIG. 1, the illustrated conduit 30 includes a stream splitter 30a where the single input conduit branches into numerous branch conduits 30b, of which five are shown. The number of branch conduits 30b is equal to at least the number of constituents to be measured and often exceeds this number as explained hereinafter. In the illustrated analyzer the branch conduits 30b are of flexible and inert tubing and extend through the proportioning pump 27, which is of the peristaltic type. As the pump draws the sample and diluent liquids through the conduit stream splitter, the liquids divide and aliquots of them enter the branch conduits.

After division, the plural aliquots are pumped from the branch conduits 30b to a reactor 40. The illustrated branch conduits 30b are of the same length, or are otherwise arranged, so that all aliquots of the same sample reach the output ends of the branch conduits, and hence arrive at the reactor 40 at essentially the same time.

The conduit length from the input to the sampler probe 28 to the output, downstream, side of the pump 27 preferably is short so that transit time of sample liquid through it is relatively brief. However, where the reactor 40 is relatively remote from the pump 27, a considerably longer time may be required for the sample aliquots to traverse the corresponding lengths of the branch conduits to the reactor under pressure from the proportional pump. Accordingly, as further shown in FIG. 1, the illustrated analyzer includes high-speed pump means for accelerating the transfer of the diluted sample aliquots from the pump 27 to the reactor 40.

This pump means is formed by a valve 35 which selectively introduced pressurized air (or other gas) from a supply 37 into each branch conduit immediately downstream from the engagement of the branch conduits with the proportional pump. The air supply 37 delivers air under pressure to the valve, and a feeder conduit 38 delivers the air from the valve to each branch conduit with a Y, T or like fitting. The entrance of the feeder conduit 38 to each branch conduit 30b preferably is relatively small so that liquid does not leak into the feeder conduit 38 when valve 35 is closed.

The valve 35 is normally closed, and the control unit 18 opens it for a brief interval in every cycle at a time after the diluted sample aliquots just introduced to the conduit 30 are in the branch conduits 30b downstream from the pump 27. The resultant air thrust which the open valve 35 applies to the branch conduits pushes the diluted aliquots quickly to the reactor 40. In the vent the valve 35 opens before all diluent and sample liquids are beyond the entry of the feeder conduit 38 into the branch conduits, the positive displacement of pump 27 will nevertheless ensure that the entire volumes of these liquids advance down the branch conduits.

The illustrated reactor 40 has a number of reaction magazines 42, 44 and 46 equal to the number of measurements to be made on each sample, and each reaction magazine is a rotary tray-like conveyor which carries a number of reaction cups 48. The cups are disposed equally spaced apart circumferentially on the tray-like magazine. The cups preferably are provided, at least in some instances, in groups of two or more associated cups at the same rotary position on the conveying magazines of the reactor. For this purpose the cups of the illustrated reaction magazines are ordered in two concentric circular arrays or rows with the same number of cups in each row, as illustrated. Further, each cup in one row is associated with a cup in the other row and the associated cups are radially in line with each other on the rotary magazines.

The reaction magazines are mounted to rotate about a vertical axis 50, and to reciprocate up and down along this axis. Although the illustrated magazines move relative to a common axis 50, each reaction magazine may have a separate axis. A reactor drive unit 47 is coupled with the reaction magazines and imparts both these motions, i.e. rotational incrementing and vertical reciprocation, to them. In particular, in each cycle of the analyzer operation, the drive unit 47 operates in conjunction with the control unit 18 successively to lower the reaction magazines from an upper position which is illustrated, rotate them incrementally to advance each cup by the circumferential spacing between cups, and raise the magazines back to the upper position. Automatic motor or otherwise-driven mechanisms for imparting these motions to the reaction magazines are known; see for example the disclosures of similar drive mechanisms for use in prior art automatic chemical analyzers in U.S. Pats. Nos. 2,872,894 and 3,527,101.

As also shown in FIG. 1, the branch conduits 30b terminate in nozzles that project downward into the mouths of the reaction magazine cups, to discharge the aliquots of diluted sample into them, when the magazines are in the raised position. The rotational position of a reaction magazine cup when it is thusly disposed under a branch conduit nozzle is termed an "initial" position 40a. As is described hereinafter, other nozzles and tubulatures project into the cups when the reaction magazines are raised. The reaction magazines are lowered to remove the cups below these nozzles and tubulatures and thereby allow the magazines to rotate relative to them.

In addition to receiving sample aliquots, the reaction magazines receive, under control of the control unit 18, selectively metered volumes of chemical reagents from reagent feeders 52, 54, 56 and 58. In the illustrated analyzer, reagent from feeder 52 is delivered to each cup 48 in the outer row thereof on reaction magazine 42 in the first rotational position after the initial position. Thus in each cycle of operation, the cup on reaction magazine 42 in the initial position receives a sample aliquot and the cup in the next, adjacent position receives reagent from the feeder 52. As the reaction magazine 42 rotationally increments to carry the cups through subsequent positions, in subsequent operating cycles, the reagent and sample aliquot in each cup react to produce the reaction product that measures the constituent of interest.

The reaction magazine 44, which receives two identical sample aliquots, one in each row of containers, receives reagent in both rows. However, for performing a differential measurement, the cups in the outer row thereof receive a reaction-producing reagent from feeder 54, whereas a reagent feeder 56 delivers a blank reagent to the cups of the inner row. This blank reagent typically is a liquid of the same color as the reagent from feeder 54 but which causes no color-changing reaction with the diluted sample aliquot already in the inner row cups of the magazine 44. Tubings 60 and 62 deliver these different reagents to the reaction magazine 44 at rotational positions removed several steps or positions from initial position 40a in order to allow the sample aliquot in the outer row cup to react with reagent from the feeder 54 for only a limited time before the reaction product is measured.

To measure the rate of a reaction involving the sample, as noted above and as is desired for example in enzyme analysis of blood, aliquots of the same sample are delivered to the initial-position cups in both rows of the reaction magazine 46. At a selected first subsequent rotational position on the reaction magazine, feeder 58 introduces reagent to each cup in the inner row, and this reagent commences reacting with the sample aliquot. At a second rotational position further removed from the initial position, the same feeder 58 delivers an identical volume of the same reagent to each cup in the outer row on magazine 46. Thus, each inner-row cup of magazine 46 contains a reaction that at any time is more advanced timewise than the reaction in the associated, radially adjacent, outer row cup containing an aliquot of the same sample. Consequently, the simultaneous measurements of the reaction products in the two radially-adjacent cups identifies the rate at which the product-producing reaction is proceeding.

The aforementioned measurements of the reaction product are performed typically with photometers 64, 66, 68 and 70; and the electrical signals from them are applied to the read-out device 24. The read-out device processes these signals, in accordance with electrical commands from the control unit 18, and in the illustrated analyzer prints the measured data, together with sample identification or other information received from the record reader 22, on a chart 72. Photometer 66 is of the differential type to produce an electrical output signal corresponding to the difference in optical density at the wavelength of interest between the non-reacted aliquot in an inner cup on reaction magazine 44 and the reacted aliquot in the radially adjacent, outer-row cup. This photometer 66 and the other photometers 64, 68 and 70 can be of conventional construction, each typically with an optical source, an aliquot-receiving flow cuvette, and an optical detector.

The illustrated analyzer employs a preferred arrangement in that the photometers measure all of the aliquots of each sample in the same operating cycle. For this purpose, all the photometers receive the liquids which are in the reaction magazine cups at a common rotational position 40b, termed a "measure position," which is removed from the intial position by a uniform number of incremental steps.

A final operation performed with the reaction magazine cups 48, between the measurement position 40b and the further advance to return them to the initial position 40a, is to cleanse them and thereby ready them to receive aliquots of a fresh sample. For this purpose, the analyzer includes a wash liquid reservoir and dispenser 71 and a drying gas supply 73. This cup cleansing operation, and the photometric measuring operation, are now described in further detail with reference to FIGS. 2 and 3 in connection with further reference to FIG. 1.

Figure 2:
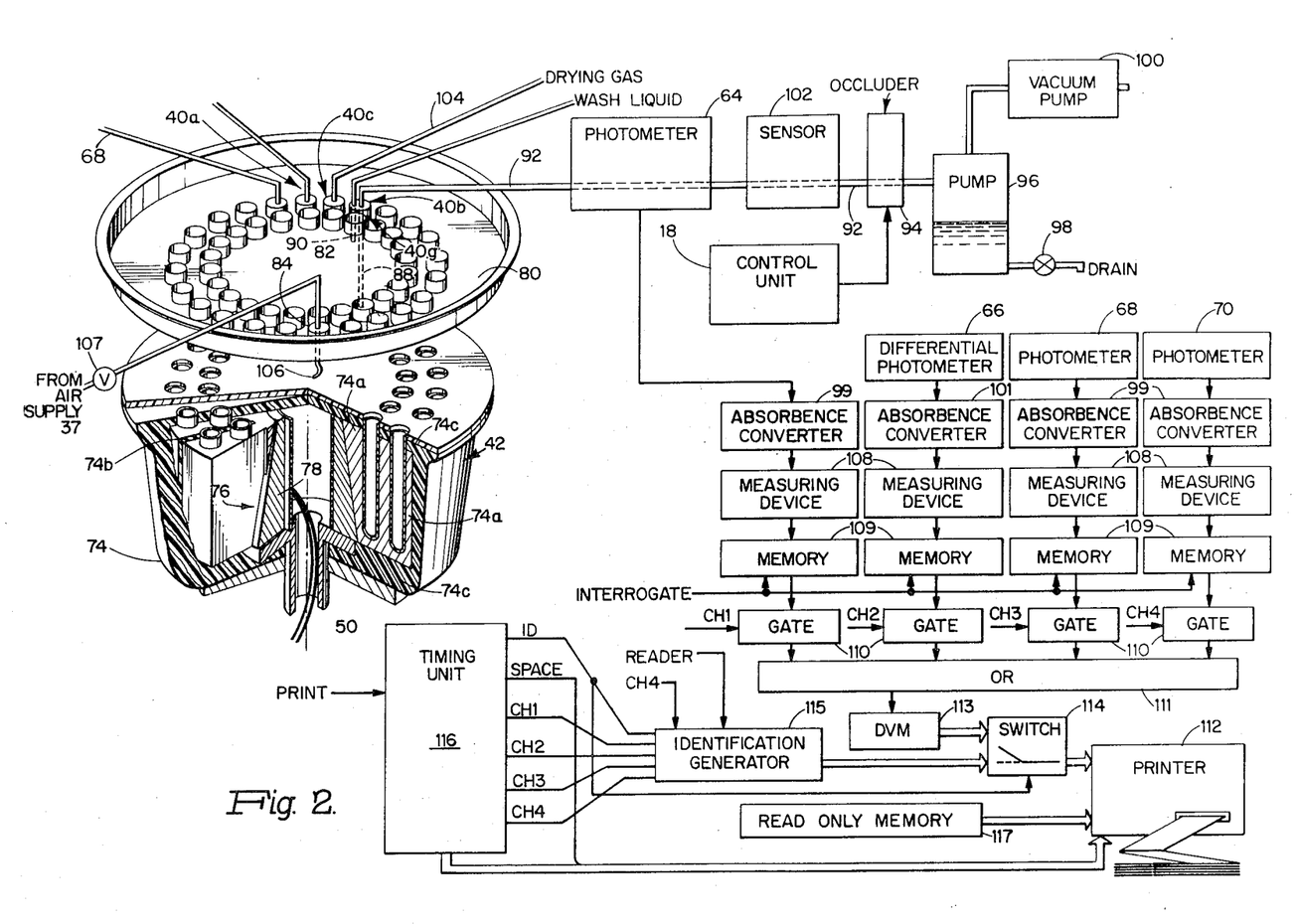
FIG. 2 shows further details of a reaction magazine and of components connected with it in accordance with the invention and for use in the instrument of FIG. 1.
Figures 3, 4:
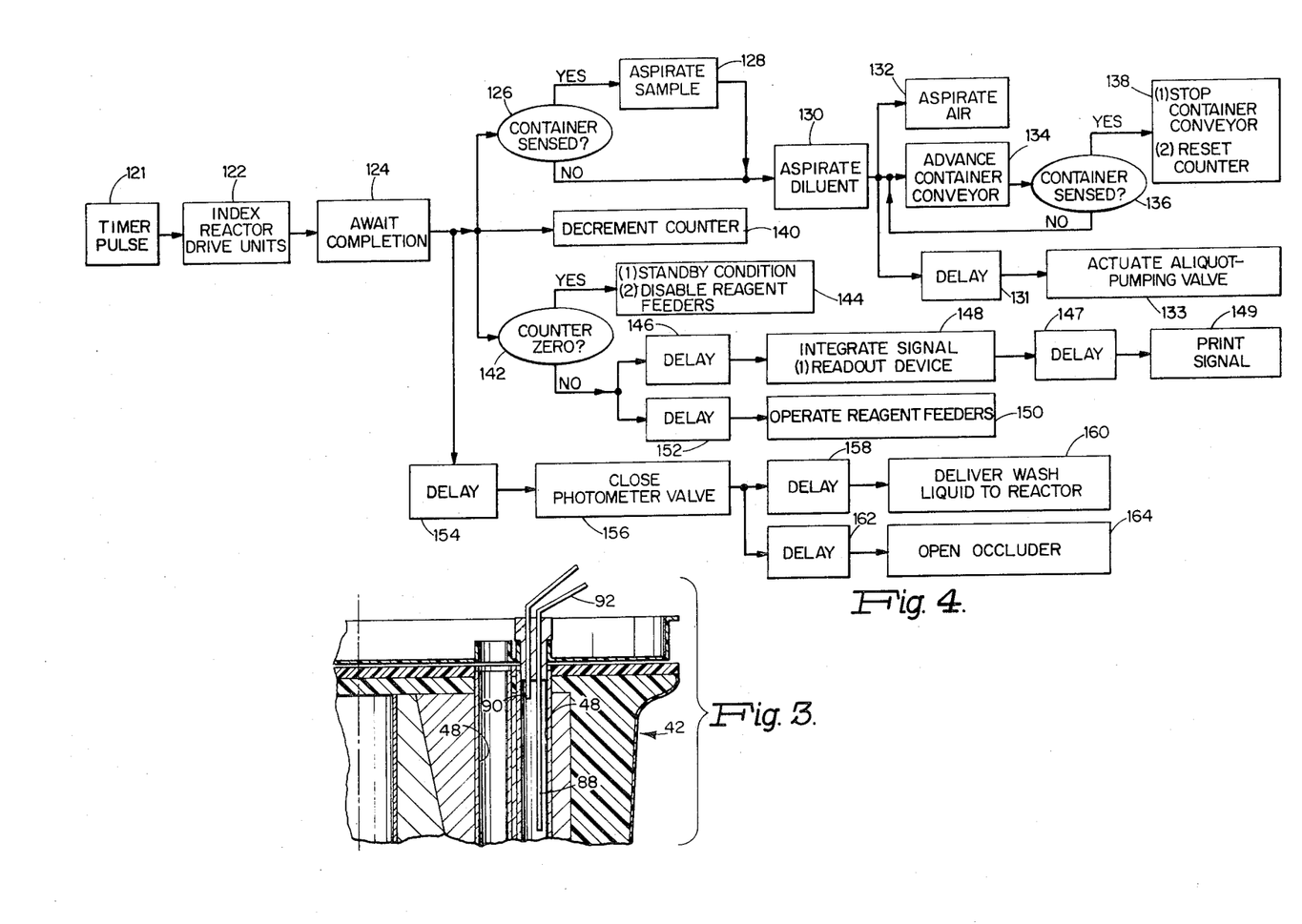
FIG. 3 is a fragmentary cross-sectional view of the reaction magazine shown in FIG. 2, taken along line 2—2 thereof.
FIG. 4 is a flow chart illustrating the operating sequence of the instrument of FIG. 1.

FIG. 2 shows the reaction magazine 42 of FIG. 1, which is typical of the other reaction magazine, in greater detail and further shows in greater detail the other analyzer components that operate to transfer reacted sample from the magazine 42 to the photometer 64, and to cleanse the magazine and photometer. FIG. 2 shows the reaction magazine 42 in the lower position, where it is free to increment about the axis 50, whereas FIGS. 1 and 3 show it in the raised position. The illustrated reaction magazine is constructed in the manner described in detail in the copending and commonly-assigned application entitled "Thermally-Stabilized Transport for Reaction Containers," Ser. No. 105,824, filed Jan. 12, 1971 in the names of M. Jordan and J. Peleckis and now abandoned.

In accordance with this construction and as illustrated in FIGS. 2 and 3, the reaction magazine 42 has an annular drum 74 mounted concentric with the axis 50 and which carries the cups 48, which are of glass or other chemically inert and easily cleansed material. The drum 74 has a central hollow 76 to seat a frusto-conical heater 78 for use in carrying out chemical reactions at elevated temperatures. The magazine 42 is constructed with thermal conductors and with thermal insulators to maintain the radially adjacent cups at the same temperature, i.e. closely coupled together thermally, and to minimize circumferential heat transfer, i.e. with relatively high thermal isolation between circumferentially adjacent cups. In particular, the drum 74 has segments 74a of thermally-conductive material such as aluminum, and each of which extends radially outward from contact with the heater 78 to mount a pair of radially adjacent cups 48. Barriers 74b of thermal insulation are interposed between circumferentially-adjaecnt segments 74a, and a blanket 74c of thermal insulation extends over, under and outwardly around the segments 74a and barriers 74b to isolate these elements, and hence the cups 48, thermally from ambient temperatures.

Mounted in the analyzer above each reaction magazine is, as shown in FIG. 2, a tubulature-supporting programming plate 80. The plate can be free for limited movement transverse to the axis 50 to seatably receive the reaction magazine as it is raised, but the plate is otherwise fixed. The plate is apertured with holes 82 patterned identically to the location of the cups 48 in the reaction magazine 42. At each rotational position of the reaction magazine where fluid is to be delivered to, or removed from, a cup, the appropriate nozzle, probe or other tubulature or implement is seated to the plate 80 by means of a plug 84. Thus, the vertical output end of the sample-feeding branch conduit 30b is seated with a plug 84 in the plate 80 in registration above the initial position 40a of reaction magazine 42. Similarly, the tubing 86 from the reagent feeder 52 terminates with a depending nozzle which is seated, by means of a like plug, in the plate 80 at a location corresponding to the reaction magazine position where reagent is to be introduced to the cups thereof.

With the programming plate 80, it should be noted that tubulatures can be plugged into it readily to program the plate 80 and the reaction magazine associated with it to perform any of a variety of constituent-measuring reactions. As illustrated, one can select whether cups in only one row or in both rows on the reaction magazine receive a sample aliquot, and one can freely select the one or more reagents that are to be added to the sample, as well as the timing and sequence of the reagent introduction. Although not illustrated, it will be apparent that reagents from different reagent feeders can be introduced simultaneously or in desired succession to each sample aliquot. Also, where desired, ragent can be introduced to a cup prior to the sample aliquot. In addition, the tests to be performed can be selected, once the analyzer is set up, simply by controlling which reagent feeders deliver reagent to the reactor 40. This can be done, for example, by means of manual control switches on the control unit 18.

The illustrated reaction magazine plate 80, has, at the location corresponding to the measuring position 40b on the magazine 42, both an aspirating probe 88 and a wash liquid nozzle 90. The nozzle 90 is connected to the wash liquid reservoir and dispenser 71 of FIG. 1 for delivering wash liquid to the magazine cup 48 at the measuring position, when the dispenser is actuated by the control unit 18. The aspirating nozzle 88, which is at the input end of tubing 92 leading to the photometer 64, extends below the plate 80 for a length sufficient to extend as close as desired to the bottom of a cup 48 on the raised reaction magazine 42. Downstream from the photometer 64, the tubing 92 passes throuugh an occluder 94 and thence into a sump container 96. The sump container 96 can be drained from the bottom, illustratively under control with a valve 98, and the tubing 92 enters the sump container at a point vertically far removed from the container bottom. In addition, a vacuum pump 100 is connected to the top of the sump container 96 to pump fluid out from the vapor space in the sump container.

During illustrative operation of the analyzer, the vacuum pump 100 operates continuously, normally drawing air through the tubing 92 and the vapor space in the sump container. When, after a rotational increment, the reaction magazine 42 is being raised, as soon as the liquid in the cup 48 in the measuring position 40b on the magazine covers the bottom of the aspirating probe 88, the vacuum pump begins to draw a partial vacuum in the tubing 92 and sump container vapor space. After a selected brief time, as provided for example by a fixed-delay circuit in the control unit 18, this unit actuates the occluder 94 to block the tubing 92 intermediate the photometer 64 and sump container 96. Beginning simultaneous with the immersion of the aspirating probe in the reacted sample aliquot and continuing after the occluder closes, the partial vacuum in the tubing 92 draws the reacted aliquot from the magazine cup in the measuring position into the probe 88 and through the tubing 92 to the photometer 64. The leading portion of the reacted aliquot passes beyond the photometer before the partial vacuum in the occluded tubing 92 is equalized. The flow in the tubing then stops, with a portion of reacted sample aliquot stationary in the photometer, where it is measured.

In an alternative arrangement, rather than close the occluder 94 at a fixed time selected to allow the pump 100 to develop a vacuum in the tubing 92 sufficient to draw reacted sample to the photometer, a sensor 102 is provided along the tubing 92 between the photometer and occluder. The sensor senses the arrival of the reacted sample aliquot at the output side of the photometer and produces a signal that closes the occluder.

With either construction, after reacted sample material is aspirated from the reaction magazine cup at the measuring position to the photometer 64, the occluder is closed for a brief time. During this interval, the photometer produces an electrical signal which is a measure of the optical density of the reacted sample material, and sends the signal to the read-out device 24. The occluder then opens, and the pump 100 draws the reacted sample material in the conduit 92, including the photometer cuvette, and any liquid in the reaction magazine cup to the sump 96.

To wash the reaction magazine cup, probe 88 and tubing 92 (including the cuvette of photometer 64), the control unit 18 actuates the wash liquid reservoir and dispenser 71 of FIG. 1, during the interval when the occluder 94 is closed, to deliver wash liquid to the cup by way of wash nozzle 90. Preferably the dispenser delivers a volume of wash liquid greater than the largest volume of sample aliquot and reagent that is to be in any cup, but less than the cup capacity. Thereafter, as soon as the occluder 94 opens, this wash liquid is drawn out of the cup and through the tubing 92 to the sump 96, thereby cleansing the cup, as well as the probe 88 and the tubing 92. Where desired, the wash liquid reservoir and dispenser can be operated to discharge a second quantity of wash liquid, or of a different rinse liquid, to the reaction magazine cup 48 to effect a second wash or rinse of the cup, probe and tubing 92.

In the next cycle of the illustrated analyzer, the cup 48 that previously was at the measuring position is disposed at a "last" position 40c where the plate 80 (FIG. 2) mounts a gas tube 104. The tube receives a flow of drying gas, typically a continuous stream of warm filtered air, from the drying supply 73 (FIG. 1) and hence delivers it to the cup which is at this position 40c. The gas dries wash liquid from the cup and hence at the end of this cycle the cup, which is then advanced again to the initial position 40a, is ready to receive an aliquot of a fresh sample.

FIG. 2 shows a further optional feature of the analyzer of this invention whereby a mixer is provided at one or more selected positions of the reactor 40. For this purpose, the programming plate 80 mounts an air nozzle 106 to direct a jet of air (or other gas) onto the liquids in a cup 48, at a position after reagent is introduced. A valve 107 operated by the control unit 18 controls the delivery of the air to the nozzle, suitably from the FIG. 1 air supply 37. The nozzle is preferably oriented to direct the air jet tangentially into the cup, to produce a whirling motion of the aliquot and reagent in it. This mixer construction is generally preferred, although others such as vibratory or mechanical can be used instead.

With further reference to FIGS. 1 and 2, the illustrated analyzer read-out device 24 has a separate absorbence converter 99, 101 receiving the electrical signal from each photometer 64, 66, 68 and 70. Each converter 99 is connected with a photometer 64, 68 and 70 and produces an output signal responsive to the log of the associated photometer signal and hence proportional to the absorbence of the reacted aliquot material in the photometer. The converter 101, connected with the differential photometer 66, produces an output signal responsive to the log of the photometer signal which measures the reacted aliquot divided by the photometer signal which results from the unreacted aliquot which that photometer receives. This ratio signal is thus proportional to the difference in absorbence between the two liquids which the photometer 66 receives from reaction magazine 44.

A separate measuring device 108 receives the electrical signal from each converter, and a memory device 109 and a gate 110 are associated with each measuring device. Each measuring device stores calibration information and converts the electrical analog, absorbence signal it receives to an electrical signal which is a measure of the constituent concentration, or the like, with reference to this calibration information. Absorbence converters and measuring devices of this nature are known and can be constructed with conventional skills. At the time when the liquids to be measured are in the photometers, the control unit 18 applies an interrogate signal to each memory device 109 to cause it to store the resultant constituent-measuring signal which it receives. The memory device can store this analog signal with a capacitor, and a reed-switch or similar component in the memory device can apply the measuring device signal to the capacitive storage circuit therein in response to the interrogate signal.

In this manner all the photometer signals which are present at a single time, and hence which identify different constituents in a single sample, are simultaneously stored. The gates 110, in turn, apply the stored signals to the printer 112 of the read-out device 24 at one or more selected times. In the illustrated arrangement, the stored signals are applied to the printer in succession, and each item of constituent-measuring data is printed on a separate line of the chart 72. For this purpose, each gate 110, which also can be a reed-switch or like component, is enabled separately from the others by a signal termed a "channel" signal, and when enabled applies the signal stored in the associated memory device to the printer 112 successively by way of an OR circuit 111, a digital volt meter (DVM) 113 that converts the analog signals to digital format, and a routing switch 114. As indicated in FIG. 2, the switch normally applies the DVM output signals to the printer, and switches from this position to apply the output signals from an identification generator 115 to the printer in response to an ID signal from a timing unit 116.

The timing unit, of conventional construction such as employs a clock incrementing a shift register, responds to a "print" signal from the control unit 18 to produce signals on different output terminals in a prescribed sequence. The illustrated signal sequence includes an identification (ID) signal, a space (SP) signal, and four successive channel (Ch) signals. The timing unit in addition applies other signals to the printer 116 to initiate each print, paper advance, and like operation.

The identification generator 115 includes the register or other information store that stores the sample-identifying signals from the reader 22 which reads the sample container cards 16. It typically also has a counter which is advanced by the timing unit with the channel 4 signal, i.e. after each cycling of the timing unit. With these inputs, the identification generator 115 can apply to the printer 112, via the routing switch 114, both a sequential numerical identification of each sample and identification read from the original container of each sample.

The read-out device 24 also has a read-only memory (ROM) 117 constructed to apply to the printer 112 the different items of legend information for each constituent which the analyzer measures, as well as for the sample identity. Input signals to the ROM are the timing unit identification, channel 1, channel 2, channel 3 and channel 4 signals.

During the operation of the illustrated read-out device 24, an interrogate signal causes the memory device 109 to store the analog signals then present at the output of measuring device 108, and a print signal actuates the timing unit 116 to commence the sequence for printing all the date which the analyzer develops for a single sample. The identification signal from the timing unit both actuates the routing switch to apply the identification generator 115 signals to the printer 112, and causes the ROM 117 to apply the identification-legend signals to the printer. Other signals from the timing unit cause the printer to print the characters which these signals identify, and to advance the chart paper in the printer.

After advancing a further space on the printer chart, the timing unit produces the channel 1 signal which enables the gate 110 associated with the data channel including photometer 64. The printer accordingly receives, by way of the DVM 113 and the switch 114, digital signals responsive to this photometer signal and receives, from the ROM 117, the legend-identifying signals for the constituent being measured with this channel of the analyzer. The printer then records the characters which these signals identify. In like manner, the read-out device 24 records the measured data and legend for each other measuring channel of the analyzer.

Turning now to the control unit 18, in accordance with the foregoing description of the illustrated analyzer, this unit sequences and otherwise controls the operation of all elements of the analyzer except for the proportional pump 27, vacuum pump 100 and drying gas supply 73, each of which operates continuously.

Further in accordance with the foregoing description, the input and output electrical signals of the control unit 18 in the illustrated analyzer are as follows. The control unit applies a signal to the conveyor drive unit 10a to actuate the conveyor and the control unit receives a signal from the container sensor 20 which it processes to stop the conveyor drive unit 10a. The control unit applies further command signals to the sampler unit 26 for controlling its operation and receives from this unit signals developed with the sensors 34 and 36. The control unit also controls the aliquot-pumping valve 35.

With regard to the reactor portion of the analyzer, the control unit applies signals to the reactor drive unit 47 to control its operation for reciprocating and incrementing the reaction magazines and, further, receives a signal from the unit 47 upon the completion of this sequence of reaction magazine movements. The control unit 18 also applies heater current to each reaction magazine 42, 44 and 46 which processes an aliquot with a chemical reaction requiring incubation at an elevated temperature, and receives control signals from thermosensitive elements in these reaction magazines; the implementation of this heater control portion of the analyzer is well known and accordingly is not shown. Each reagent feeder 52, 54, 56, and 58 operates under control of a signal from the control unit 18, and the control unit actuates the wash liquid reservoir and dispenser 71 to operate in the manner described hereinabove. The air-jet mixer valve 107 also operates under command by the control unit.

Further output signals from the control unit are the ones applied to the occluders located downstream from the photometers, and the interrogate and print signals applied to the read-out device 24.

The construction of the control unit 18 for responding to these signals which it receives and for developing the signals which it applies to other elements of the analyzer requires only conventional logic implementation techniques and accordingly is not described in detail. However, as indicated in FIG. 1, the control unit includes a clock or other timer 118, a logic section 119, and a counter 120. The control unit employs the counter to keep track of the number of times it must increment the reaction magazines and operate the associated analyzer components in order to process completely all samples delivered to the analyzer. Accordingly, each time the analyzer takes in a new sample, the control unit counter 120 is reset to the number of positions through which the reaction magazines increment in completing a full cycle. This can be implemented, for example, by resetting the counter 120 each time the container sensor 20 produces a signal reporting the arrival of a new container at the sampling position on the conveyor 10. Further, the control unit decrements the counter by one unit each time it sequences the reactor drive unit 47 through an operating cycle. With this logic arrangement, the counter of the control unit continuously is set to the number of reaction-magazine increments required to complete the processing of the samples in the analyzer.

The arrangement of the control unit logic section 118 will become apparent from the following discussion of the FIG. 4 flow chart according to which the illustrated analyzer operates under control of the control unit 18. When the analyzer is on and operating, each operating cycle commences with a timer pulse from the control unit clock 118, and which is represented by the flow chart action box 121. The control unit 18 processes this pulse to actuate the reactor drive unit 47 to index the reagent magazines 42, 44 and 46, i.e. to lower the magazines, rotate them incrementally by one position and then raise them, as indicated by action box 122. Upon receipt of a signal by the control unit signaling the completion of this operation, as indicated with action box 124, the analyzer operation proceeds with several parallel sequences.

First, when the container sensor 20 senses a sample container in the sampling position on the conveyor and produces an output signal, as indicated in the flow chart with a "yes" output from decision box 126, the control unit operates the sampler 26 to aspirate a sample of the liquid from the new container 12a at the sampling position, as further indicated with action box 128. This operation terminates when the sampler sensor 34 produces a signal reporting arrival of the leading edge of the aspirated sample. In the event no container is sensed, as indicated in the flow chart with a "no" output from the decision box 126, the control unit skips the aspirate operation of box 128. Thereafter, whether or not a container is sensed, the control unit signals the sampler and diluent adder 26 to aspirate diluent, action box 130. Upon completion of this operation, which is effected in response to the signal from the second sampler sensor 36, the control unit operates the sampler 26 to aspirate air, action box 132 (i.e. moves the probe to the intermediate position as discussed above). Where the aliquot-pumping air valve 35 is provided, the control unit opens it for a time to deliver the aliquots to reactor 40 and then closes it, action box 133, at a selected time, action box 131, after cessation of diluent intaking.

Also, after aspirating sample, the control unit signals the conveyor drive 10a to advance the conveyor, as indicated in the flow chart with action box 134. As indicated with decision box 136, this operation continues until a container is sensed, at which point the container conveyor is stopped and the control unit resets the counter 120 therein to the full number of rotational increments required for completing a full revolution of the reaction magazines.

With further reference to the flow chart of FIG. 4, and returning to the juncture where the reactor drive unit 47 signals the control unit that it has completed its reactor-incrementing operation per action box 124, the control unit decrements the counter 120 by one count, action box 140. Also, at this time, the control unit senses whether the counter 120 is clear, i.e. at zero, decision box 142. An affirmative determination causes the analyzer to assume a standby condition, action box 144, in which it disables the reagent feeders, so that only diluent is introduced to the reaction magazines. On the other hand, when the counter 120 is not set to zero, after a selected delay, action box 146, the control unit sends the interrogate signal, action box 148, to the readout unit for actuating the memory devices 109 to store the signals then output from the measuring devices 108. After a further delay, action boxes 147 and 149, the control unit applies the print signal to the read-out device to initiate the pirnt-out of the now-stored data.

Also when the control unit counter 120 is not at zero, the control unit operates the reagent feeders to deliver the metered amounts of the selected reagents according to the manner in which the reagent feeders are connected with the reaction magazine plates 80; this operation is indicated with action box 150 and may, as indicated, occur after a selected (optional) delay, action box 152.

A final sequence of operations which the control unit performs upon completion of an increment operation by the reactor drive unit 47 commences after a selected delay, action box 154. First, the control unit signals the occluders associated with the several photometers, such as the FIG. 2 occluder 94, to close, action box 156. After a brief delay, action box 158, which ensures that the flow into the photometer cuvettes has come to rest, the control unit actuates the wash liquid reservoir and dispenser 71, action box 160, to deliver a metered volume of wash liquid to each reaction magazine. Also at a fixed time after the occluder closes (action box 162) and during which the wash liquid is delivered to each cup in a reaction magazine measuring position 40b as just noted and during which the interrogate signal is produced (action box 148), the occluders open, action box 164.

With the foregoing sequence of operations in each operating cycle of the analyzer, it will be understood that in each cycle the reaction magazines are incremented; a sample is withdrawn from the sample container at the conveyor sampling position and aliquots of it are delivered to the different reaction magazine cups at the "initial position"; reagents are delivered to other cups of the reaction magazines; the occluders or other photometer output valves are actuated to hold stationary in the photometer cuvettes reacted sample being withdrawn from still other cups of the reaction magazines, and then the occluders are released and the same reaction magazine cups are cleansed; and the read-out device is signalled to store the converted photometer signals and then to print the resulting measurement data. Also, the control unit counter is reset and/or decremented; the aliquot-expediting air valve 35 is opened briefly; the container conveyor is advanced; and the stirring mechanisms for the reactor 40, if provided, are operated. The drying of reaction magazine cups at the last position occurs without further control unit operation where, as illustrated, the drying gas supply 73 is on continuously.

It will also be understood that the aliquots-conveying reaction magazines of the reactor advance each aliquot along a chemical processing path, and that incremental operation of these conveyance devices provides the advance discontinuously, i.e. with alternate times of advance and dwell. Further, the present analyzer provides such aliquot conveying with the division of a metered sample volume into the several aliquots simultaneously, and with delivery to the aliquots of one sample to the conveyance devices simultaneously. Thus, the aliquots of each sample progress through the analyzer in step with each other throughout the processing from initial formation of the aliquots to storage of the electrical signals obtained from the aliquots after completion of the chemical processing of them.

With further reference to FIG. 1, the reagent feeders 52–58 can be constructed and operated in the manner disclosed in the copending, commonly-assigned patent application Ser. No. 105,804, filed Jan. 12, 1971, for "Fluid Metering Apparatus" in the names of J. D. Bannister and A. Ferrari. Also, the copending, commonly-assigned patent application Ser. No. 105,822, filed Jan. 12, 1971, of A. Ferrari, L. J. Blumle and L. C. Bonar for "Multiple Photometer Assembly" discloses a differential photometer for use in the instrument of FIG. 1. Further, the two copending, commonly-assigned patent applications Ser. Nos. 105,802 and 105,878, both filed Jan. 12, 1971, of R. S. Badessa for "Log Ratio Signal Processor" and for "Interpolative Readout Apparatus" describe constructions well-suited respectively for each absorbence converter 99 and 101 and for each measuring device 108 of FIG. 2.

We have described above an identification system in which a machine readable card 16 (FIG. 1) carried by the sample container 12 was read and the identification stored in the readout device 24 to be printed out with results of the sample analysis. While such a system is workable, other sampler systems may be provided. For example, the sample containers may be loaded into a plurality of separate trays, each of which carries some type of machine readable indicia. A tray will typically carry a small number, as for example eight, of sample containers. As the samples are placed in the tray, the tray number and the particular tray location are logged for each sample. The trays may be used to hold the samples during centrifugation if required, and then placed on the conveyor 10 for sequential sampling by the probe 28.

As each tray moves into a location where the first sample is in a position to be sampled, its number is read and stored. Additionally, a counter is set to "1." As the conveyor indexes, to each successive sample, the counter is correspondingly indexed until a number corresponding to the number of samples in the tray is reached. This counter signal is supplied to a memory, typically in the readout device 24, and the analysis results for a given sample are printed out with a tray number and position number identification. Thus, by way of example, the results from the sample in position three of tray number 27 would be printed out with a 27–3 identification.

Appropriate means are provided for resetting the tray position counter to "1" each time a new tray number is sensed. Also, appropriate means are provided for sensing the absence of a container in a particular tray position so that the conveyor can immediately index to the next position without waiting for the sampler to operate. This system is simpler than the card reading system described and may be a preferred system in some application.

In some analyzers embodying this invention, it may be desirable to interrupt the aspiration of fluid into the tubing that leads to the photometers during the return of he reaction magazines to their raised positions, e.g. into tubing 92 (FIGS. 2 and 3) leading to photometer 64, during the time the reaction magazine 42 is being raised from the lowered position in which it is incrementally rotated. The reason for this is to ensure that the tubing 92 probe 88 is fully immersed in the reacted aliquot throughout the aspiration of this liquid from the reaction magazine and into tubing 92. This, in turn, ensures that no air is aspirated into the photometer cuvette with the reacted sample liquid. The operating sequence described above, particularly with reference to FIG. 4, can provide this operation, for example, by closing the occluder 94 (FIG. 2) during the indexing of the reactor drive unit, action box 122.

As a further indication of the various embodiments of this invention, the analyzer of FIG. 1 can be operated to deliver reagent to each cup 48 or other reaction vessel simultaneously with the delivery to it of the diluted sample aliquot, except where the chemical reaction being performed precludes such operation. This simultaneous delivery of reagent with the aliquot enhances thorough mixing between them.

Figure 5:
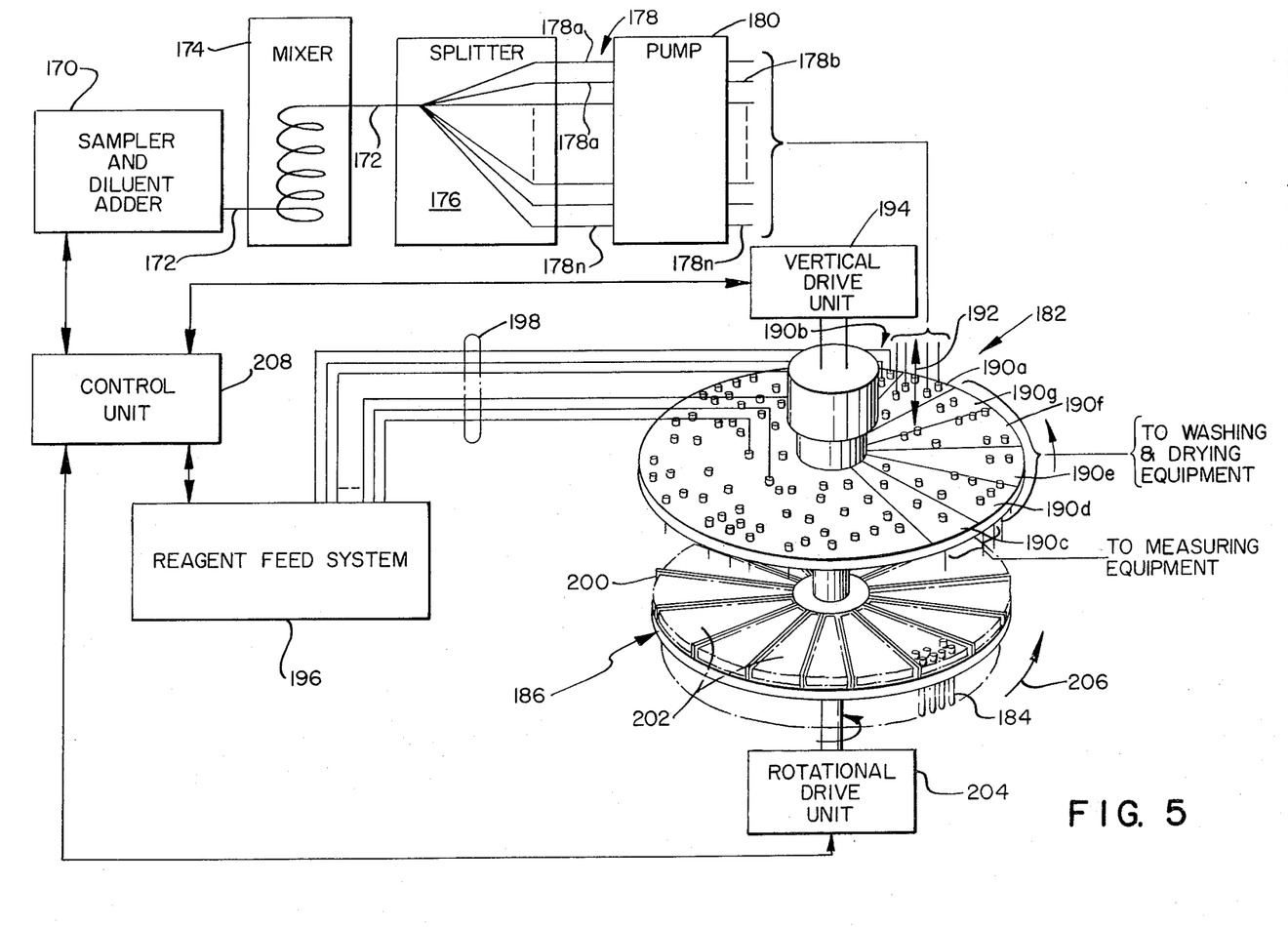
FIG. 5 is a pictorial representation of another automatic analysis instrument according to the invention.

FIG. 5 shows another instrument according to the invention for performing constituent-identifying analyses in the same manner as the instrument disclosed above with reference to FIGS. 1 through 4. However, rather than have separate reaction magazines or other conveyors for each constituent analysis to be performed, the instrument of FIG. 5 employs a single conveyor.

The instrument of FIG. 5 has a sample and diluent adder 170 for introducing a measured volume of each sample liquid, in succession, into an input conduit 172, and for introducing a measured volume of diluent into the input conduit immediately after each sample. The conduit 172 feeds each sample and diluent segment to a mixer 174. The mixer illustrated is a vertically-extending helical coil of tubing, although other constructions can be used to mix each sample with the succeeding diluent.

From the mixer 174, the input conduit 172 continues to a stream splitter 176, where the diluted sample is divided into aliquots of selected relative volumes, each of which is delivered to a branch conduit 178a, 178b, . . . 178n. The branch conduits feed the aliquots to a proportioning pump 180, which provides the motive force for drawing the sample and diluent liquids into the sampler and diluent added 170, and along the input conduit 172 through the mixer and splitter and into the branch conduits 178. The branch conduits feed each sample aliquot from the pump to a transfer unit 182, where the aliquot is discharged into a reaction container 184, typically a test tube, carried by a conveyor 186. The illustrated conveyor is an incrementally rotating tray.

More particularly, each branch conduit 178 terminates in a nozzle or discharge tube 188 that is carried on a frame 190 of the transfer unit. The discharge tubes 188 protrude below the frame 190, which is illustrated as a circular plate apertured with tube-seating holes in a fixed pattern, similar to the arrangement of the reaction vessel programming plate shown in FIG. 2.

The transfer unit frame 190 is mounted for vertical reciprocation in the direction of arrow 192. A vertical drive unit 194 selectively lowers the frame to extend the discharge tubes 188 into the open tops of reaction containers 184 on the conveyor 186, and alternatively raises the frame to lift the tubes clear of the containers to allow the conveyor to rotate. The transfer unit frame 190 also mounts further downwardly-protruding tubes from which a reagent feed system 196 discharges different selected reagents, fed to the tubes by way of reagent conduits 198, to the containers on the conveyor 186. The conduits 198 and the sections of branch conduits 178 which connect to the discharge tubes of the transfer unit can be flexible tubing which flexes as the transfer unit frame 190 is raised and lowered.

With further reference to FIG. 5, the transfer unit frame 190 mounts downwardly-depending probes 200 and further tubes for withdrawing liquid from the reaction containers 184 and delivering it to measuring equipment, and for introducing and removing wash liquid and drying gases for cleansing the reaction containers after the removal of the sample liquids to the measuring system.

Thus, the transfer unit 182 is similar to the programming plate 80 described above with reference to FIG. 2 and to the various conduits, nozzles and probes described with reference to that figure and FIG. 3. However, the measuring instrument of FIG. 5 has a single transfer unit, whereas the instrument of FIG. 1 has separate programming plates for each constituent analysis to be performed. Further, the frame 190 of the FIG. 5 transfer unit 182 reciprocates to mate the numerous conduits and other elements thereon with the conveyor-carried reaction containers 184 and, alternatively, to raise them clear of the conveyor. The measuring equipment for use in the instrument of FIG. 5, and the elements for removing liquids to the measuring unit and for cleansing the reaction containers and the measuring equipment conduits can all be identical to that described above with reference to FIGS. 1–3 and, accordingly, is not described further.

The conveyor 186 is illustrated as a round, wheel-like plate that seats the test tubes or other reaction containers 184 in the same pattern as the pattern of tube mounts on the transfer unit frame 190. According to a preferred pattern illustrated, the conveyor 186 mounts the containers 184 in segments 202 bounded by two radii. The transfer unit 182 is arranged to deliver all aliquots of a single sample to the containers of a single segment 202 and to deliver reagents in a manner corresponding to this pattern, so that each segment of the conveyor 186 processes only aliquots of a single sample.

The conveyor 186 is mounted for rotation about a vertical axis by a rotary drive unit 204. The rotation, in the direction of arrow 206, is in incremental steps, with each step advancing the tray by one segment 202. An incubator, not shown, is generally provided below the conveyor to maintain the reaction containers at different selected temperatures. The incubator can be constructed in the manner described above with reference to FIG. 2; alternatively, it can be constructed with conventional skills with a number of concentric annular troughs, with oil or other liquid at the desired temperature circulated through each trough to maintain the reaction containers immersed therein at the desired temperature.

The analysis instrument of FIG. 5 can thus be constructed in essentially the same manner as the instrument of FIG. 1 except that instead of having a separate conveyor device for each constituent that is to be measured, there is only a single conveyor. Of course, an alternative construction is to have more than one conveyor but fewer conveyors than the instrument of FIG. 1 requires. That is, an instrument according to the invention can have two or three, for example, conveyors, each of which processes a group of aliquots. The constituent determinations performed with each conveyor are preferably selected according to such factors as the reaction times or incubation temperatures which the analyses require. Another consideration is to process the aliquots on different conveyors according to the constituent-determining chemistries involved and selected, for example, to isolate reagents or fumes involved in one analysis from another analysis which would then be carried out on another conveyor. Whatever the arrangement of the conveyor system, the further construction of the instrument can be in accordance with the foregoing discussion with reference to FIGS. 1–4, and the commonly-assigned patent applications referred to above.

Further improvements for the sampler, mixer, stream splitter, and pump portion of analysis instruments of the invention can be realized by employing the teachings of commonly-assigned, copending and concurrently-filed patent application Ser. No. 191,722 in the names of J. D. Bannister, F. L. Coller, I. DeSantis for "Method and Apparatus for Aspirating Precise Volumes of Fluid Sample." Also, an improved construction for a fluid divider 176 that can be employed in analysis instruments of the invention is disclosed in the commonly-assigned, copending and concurrently-filed patent application Ser. No. 191,611 for "Precise Fluid Dividing Apparatus" in the name of Carl R. Hurtig, Robert L. Kent and Leo J. Blumle. In addition, the commonly-assigned, copending and concurrently filed patent application Ser. No. 191,883, in the name of J. D. Bannister for "Pneumatically Operated Mixing Device" discloses an air-driven rotary mixer that can be provided on the transfer unit frame 190 of FIG. 5, or on the reaction magazines of the reactor 40 of FIG. 1, in lieu of the air mixing disclosed above with reference to FIG. 2. Also, copending, commonly assigned and concurrently-filed application Ser. No. 191,889 for "Method and Apparatus for Removing Liquid From a Container" in the name of M. Jordan discloses another construction for apparatus that removes reacted liquids from the reaction containers to the measuring equipment and for cleansing and drying the reaction containers, and which can be incorporated in analyzers of the invention in lieu of the structure described above with specific reference to FIG. 3.

Also of interest in constructing analyzers in accordance with this invention is the disclosure in the commonly-assigned, copending and concurrently-filed U.S. patent application Ser. No. 191,612 for "Sample Conveyor and Transport System" in the names of J. Peters and L. Cerulo which discloses a conveyance system for feeding sample containers to the sampler of the instrument.

It will thus be seen that the objects set forth above, among those made apparent from the preceding description, are efficiently attained, and, since certain changes may be made in the above constructions and in carrying out the above operations and sequences thereof without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

With further reference to FIG. 5, the transfer unit 182 is at least partially arranged with segments corresponding to the conveyor segments 186. Accordingly, the branch conduits 178 deliver the aliquots of each diluted sample to a segment 190a, for discharge into reaction containers in one segment 202 on the conveyor. Many of the reagent conduits 198 typically connect to discharge tubes in the transfer unit segment 190b next adjacent the segment 190a in the direction of conveyor rotation. At a transfer unit segment 190c, spaced five segments in the other direction from segment 190a, the transfer unit carries the probes that feed liquid from the reaction containers to the measuring equipment. Also, wash liquid preferably is delivered to the containers and then withdraws to the measuring equipment tubing at this segment. The next segment 190d is fitted with tubes for delivering a second wash of liquid to the reaction containers, and the next segment 190e is fitted with tubes for withdrawing the second wash liquid. The next segment 190f is again fitted with tubes for emptying the conveyor-carried containers of liquid, to ensure that all the containers are empty. At a final segment 190g adjacent the segment 190a, the transfer unit carries drying tubes for blowing liquid droplets out of the reaction containers.

Having described the invention, what is claimed as new and secured by Letters Patent is:

1. In automated fluid analyzing apparatus having chemical processing elements arranged along a plurality of fluid processing paths which receive a plurality of aliquots of each of a plurality of fluid samples in succession and which chemically process said aliquots of each sample to manifest detectable measures of different material constituents therein, and having measuring apparatus for exposure to the processed aliquots and measuring said material constituents, the improvement comprising (A) means forming a fluid-guiding first conduit, coupled for receipt of liquid samples in succession,
(B) a supply of sample diluent coupled for diluent flow to said first conduit,
(C) metering means for sensing the volumes of sample liquid and of diluent introduced to said first conduit,
(D) a plurality of secondary conduits,
(E) branching conduit-type fluid dividing means having an input connected with said first conduit for receiving sample liquid and the associated diluent and having plural outputs connected to said secondary conduits, said dividing means dividing each sample and the associated diluent into said plurality of aliquots and feeding said aliquots to said secondary conduits,
(F) conveyor means carrying plural reaction containers,
(G) pump means coupled with said secondary conduits and selectively operable for drawing sample liquid, and for drawing said diluent, into said first conduit and through said fluid dividing means to said secondary conduits, and further for the discharge of said aliquots from said secondary conduits to said reaction containers, and
(H) control means for operating said pump means and said conveyor and for introducing only a single sample to said first conduit prior to the delivery of all aliquots thereof to said reaction containers, whereby only a single liquid sample is present at a time in said first and secondary conduits.

2. In automated fluid analyzing apparatus as defined in claim 1, the further improvement comprising means for introducing chemical reagents to said conveyor-carried reaction containers for reaction with the aliquots therein to produce said detectable measures of material constituents.

3. In automated fluid analyzing apparatus as defined in claim 1, the further improvement wherein the said control means operates said processing elements and said conveyor means to move each sample aliquot along one said path substantially in step with other aliquots of the same sample in other processing paths, and in succession with aliquots of other samples, for effecting said chemical processing of each aliquot to manifest said detectable measure of a material constituent therein.

4. In automated fluid analyzing apparatus as defined in claim 1, the further improvement wherein at least said first conduit and said dividing means are free of fluid-motive means other than said pump means, which provides the sole fluid-moving source for fluid therein.

5. In automated fluid analyzing apparatus as defined in claim 1, the further improvement comprising a pneumatic pressure source coupled with said secondary conduits, along the lengths thereof between said pump means and said reaction containers, for the selective application thereto of pneumatic pressure for blowing said aliquots out of said secondary conduits into said reaction containers.

6. In automated fluid analyzing apparatus as defined in claim 1, the further improvement comprising means for at least partially mixing in said first conduit each sample fluid with the associated diluent.

7. In automated fluid analyzing apparatus as defined in claim 1, the further improvement wherein said control means operates on a repeating cyclic basis and, in each cycle introduces another sample and associated volume of diluent to said first conduit, operates said pump means to draw newly-introduced sample and diluent through said dividing means and for discharge to said reaction containers, and operates said conveyor means to carry said containers thereof further along said processing paths.

8. In automated fluid analyzing apparatus as defined in claim 1, the further improvement wherein
 (A) at least some of said containers are ordered on said container means in groups, each of which has at least two associated containers unique to that group,
 (B) said secondary conduits are arranged to deliver equal-volume aliquots of the same sample to each container of a group thereof, and
 (C) said control means operate said conveyor means and further processing elements to move said sample aliquots along said paths for chemical processing to manifest said constituent measures therein, and operate said processing elements to process said aliquots in each group thereof identically except for a selected difference to manifest said measure of a material constituent in a differential manner between the aliquots in each group thereof.

9. In automated fluid analyzing apparatus as defined in claim 1, the further improvement wherein
 (A) said metering means produces metering signals in response to the introduction of selected volumes of sample liquid and of diluent to said first conduit, and
 (B) said control means receives said metering signals and operates in response thereto.

10. In automated fluid analyzing apparatus as defined in claim 1, the further improvement wherein.
 (A) said dividing means is arranged for dividing each sample and the associated diluent substantially simultaneously into said aliquots, and
 (B) said pump means is a proportioning pump.

References Cited
UNITED STATES PATENTS

| | | | |
|---|---|---|---|
| 3,489,521 | 1/1970 | Buckle et al. | 23—259 X |
| 3,533,744 | 10/1970 | Unger | 23—259 X |
| 3,536,449 | 10/1970 | Astle | 23—259 X |
| 3,589,867 | 6/1971 | Heinz et al. | 23—253 |
| 3,615,239 | 10/1971 | Jones | 23—253 |
| 3,622,279 | 11/1971 | Moran | 23—253 |

MORRIS O. WOLK, Primary Examiner

R. E. SERWIN, Assistant Examiner

U.S. Cl. X.R.

23—259; 73—425.6; 141—130

UNITED STATES PATENT OFFICE
CERTIFICATE OF CORRECTION

Patent No. 3,764,268          Dated October 9, 1973

Inventor(s) David I. Kosowsky; Andres Ferrari; and Carl R. Hurt:

It is certified that error appears in the above-identified patent and that said Letters Patent are hereby corrected as shown below:

Column 1, lines 16 and 17, change "constitutes" to --constituents--.

Column 2, line 25, change "hig" to --high--.

Column 8, line 37, change "adjaecnt" to --adjacent--.

Column 8, line 74, change "ragent" to --reagent--.

Column 11, line 44, change "date" to --data--.

Column 15, line 10, change "he" to --the--.

Column 15, line 55, change "added" to --adder--.

Column 18, line 70, before "said reaction" delete "and".

Column 19, line 1, change "sail" to --said--.

Signed and sealed this 26th day of November 1974.

(SEAL)
Attest:

McCOY M. GIBSON JR.
Attesting Officer

C. MARSHALL DANN
Commissioner of Patents